United States Patent
Kwon

(10) Patent No.: US 11,148,496 B2
(45) Date of Patent: Oct. 19, 2021

(54) STRUT ASSEMBLY FOR VEHICLE

(71) Applicants: HYUNDAI MOTOR COMPANY, Seoul (KR); KIA MOTORS CORPORATION, Seoul (KR)

(72) Inventor: Hyo-Seop Kwon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/801,445

(22) Filed: Feb. 26, 2020

(65) Prior Publication Data
US 2021/0039466 A1 Feb. 11, 2021

(30) Foreign Application Priority Data
Aug. 9, 2019 (KR) .................. 10-2019-0097099

(51) Int. Cl.
*B60G 13/00* (2006.01)

(52) U.S. Cl.
CPC ........ *B60G 13/001* (2013.01); *B60G 2202/24* (2013.01); *B60G 2204/40* (2013.01)

(58) Field of Classification Search
CPC ... F16F 9/38; F16F 9/32; F16F 9/3242; B60G 13/001; B60G 2204/40
See application file for complete search history.

(56) References Cited

U.S. PATENT DOCUMENTS

| | | | | |
|---|---|---|---|---|
| 3,140,080 A | * | 7/1964 | Rumsey | .................. B61G 9/18 267/134 |
| 4,342,884 A | * | 8/1982 | Ban | .......................... F16F 9/16 188/282.1 |
| 2006/0043659 A1 | * | 3/2006 | Gofron | .................. B60G 11/54 267/220 |
| 2009/0084645 A1 | * | 4/2009 | Okabayashi | .......... F16F 9/0218 188/266.6 |
| 2010/0213656 A1 | * | 8/2010 | Patil | ......................... F16F 9/58 267/220 |
| 2012/0319338 A1 | * | 12/2012 | Takada | ...................... F16F 9/38 267/217 |
| 2015/0091257 A1 | | 4/2015 | Matsumura | |
| 2016/0075207 A1 | | 3/2016 | Tsunekawa et al. | |
| 2016/0084336 A1 | | 3/2016 | Tsunekawa | |
| 2018/0345749 A1 | * | 12/2018 | Dunaway | ................. H05K 7/02 |

(Continued)

FOREIGN PATENT DOCUMENTS

| | | |
|---|---|---|
| CN | 106352007 A | 1/2017 |
| JP | 2013-164092 A | 8/2013 |

(Continued)

*Primary Examiner* — James A English

(57) ABSTRACT

A strut assembly for a vehicle may include an insulator part connected to a vehicle body, a piston rod coupled to the insulator part, a damper cylinder coupled with the piston rod and having an operating fluid accommodated therein, a strike cap coupled to the upper portion of the damper cylinder, and a sliding part formed on the side surface of the strike cap. In the strut assembly, a dust cover is coupled to the sliding part. In addition, the sliding part includes one or more side surface holes formed on the side surface of the strike cap, a sliding protrusion coupled with the dust cover and mounted in each of the side surface holes, and a guide part formed in each of the side surface holes for restraining the sliding protrusion.

6 Claims, 12 Drawing Sheets

(56) References Cited

U.S. PATENT DOCUMENTS

| | | | |
|---|---|---|---|
| 2019/0293145 A1* | 9/2019 | Henneberg | F16F 9/38 |
| 2019/0293148 A1 | 9/2019 | Yasukouchi | |
| 2019/0331192 A1* | 10/2019 | Gorski | F16F 9/38 |
| 2020/0408270 A1* | 12/2020 | Kato | B60R 7/06 |

FOREIGN PATENT DOCUMENTS

| | | |
|---|---|---|
| JP | 2016-089935 A | 5/2016 |
| KR | 10-0741280 B1 | 7/2007 |
| KR | 10-2008-0024366 A | 3/2008 |
| KR | 10-1276870 B1 | 6/2013 |
| KR | 10-1744302 B1 | 5/2017 |
| WO | 2018-003673 A1 | 1/2018 |

\* cited by examiner

STRUT ASSEMBLY FOR VEHICLE

CROSS-REFERENCE TO RELATED APPLICATION

This application claims priority to and the benefit of Korean Patent Application No. 10-2019-0097099, filed on Aug. 9, 2019, which is incorporated herein by reference in its entirety.

FIELD

The present disclosure relates to a strut assembly for a vehicle, and more particularly, to a strut assembly for supporting the weight of the vehicle.

BACKGROUND

The statements in this section merely provide background information related to the present disclosure and may not constitute prior art.

As shown in FIG. 1, a shock absorber 1 includes a damper cylinder 2 in which a fluid is filled, a piston rod 3 that is resistant to the fluid and repeatedly changes the length protruded outwards from the damper cylinder 2, and a dust cover 4 configured to inhibit the fluid stained on the piston rod 3 from being exposed to floating matters in the air.

In general, the dust cover 4 is manufactured in a bellow shape formed of a polymer material. The dust cover 4 has both ends in the longitudinal direction fixed to an end portion of the piston rod 3 and to the other end portion of the damper cylinder 2, respectively. As the reciprocation of the piston rod 3 is repeated, the elasticity of the dust cover 4 is reduced. The dust cover 4 with the reduced elasticity could be separated from the piston rod 3 or the damper cylinder 2 when the length of the piston rod 3 protruded from the damper cylinder 2 was fully extended.

We have discovered that when the dust cover 4 is separated from the piston rod 3 or the damper cylinder 2, the floating matters in the air are stained on the fluid existing on the surface of the piston rod 3. Dust and water, which are floating matters in the air, change the viscosity of the fluid. In addition, it is also possible to block the flow path formed so that the fluid flows into the damper cylinder 2. Accordingly, when the dust cover 4 is separated from the piston rod 3 or the damper cylinder 2, the performance of the shock absorber 1 is deteriorated, and noise and vibration at operation of the shock absorber 1 are generated.

In addition, when the dust cover 4 is mounted on the shock absorber 1 by increasing its length considering the deterioration of the elasticity of the dust cover 4, we have discovered that a hole is formed in the surface of the dust cover 4 because of the combined action of the torsion generated in the shock absorber 1, and the compression and tension of the dust cover 4 act in combination. In addition, the length of the piston rod 3 protruded from the damper cylinder 2 for each vehicle is different, thereby making it difficult to share the dust cover 4 in other vehicles.

The above information disclosed in this Background section is only for enhancement of understanding of the background of the present disclosure, and therefore it may contain information that does not form the prior art that is already known to a person of ordinary skill in the art.

SUMMARY

The present disclosure provides a strut assembly for a vehicle, which inhibits a dust cover from being separated from a piston rod or a damper cylinder.

The strut assembly for a vehicle in accordance with a form of the present disclosure includes an insulator part connected to a vehicle body, a piston rod coupled to the insulator part, a damper cylinder coupled with the piston rod and having an operating fluid accommodated therein, a strike cap coupled to the upper portion of the damper cylinder, and a sliding part formed on the side surface of the strike cap. In addition, a dust cover is coupled to the sliding part.

The sliding part may include one or more side surface holes formed on the side surface of the strike cap, a sliding protrusion coupled with the dust cover and mounted in each of the side surface holes, and a guide part formed in each of the side surface holes so as to restrain the sliding protrusion. In addition, the guide part may be formed by digging longitudinally along the side surface of the strike cap at the side edges of the side surface hole.

The sliding protrusion may include a body inserted into the side surface hole, a fixing projection formed to protrude from the upper surface of the body and fastened to the dust cover, and an insertion part formed to protrude from the side surface of the body and inserted into the guide part.

The body may be configured so that the longitudinal width of the body in a direction in which the piston rod reciprocates is smaller than the longitudinal width of the side surface hole, and the lateral width of the body in a direction perpendicular to a direction in which the piston rod reciprocates is equal to the lateral width of the side surface hole.

A strut assembly for a vehicle in accordance with another form of the present disclosure includes a sliding part coupled with a dust cover mounted between a damper cylinder and a piston rod. The sliding part includes one or more side surface holes formed on a surface of the damper cylinder, a sliding protrusion coupled with the dust cover and mounted on each of the side surface holes so as to move according to the movement of the dust cover, and a guide part formed on each of the side surface holes so as to restrain the sliding protrusion, and the guide part is formed by digging longitudinally along the side surface of the damper cylinder at side edges of the side surface hole.

When the piston rod moves outwards from the damper cylinder, the sliding protrusion may move in an upward direction, which is the same moving direction of the piston rod, and when the piston rod moves into the damper cylinder toward, the sliding protrusion may move in a downward direction, which is the same moving direction of the piston rod.

A stopper configured to restrain the length of the piston rod moved into the damper cylinder may be provided on an end portion of the piston rod, the damper cylinder may include a strike cap contacting the stopper, and the one or more side surface holes may be formed in the strike cap.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will not be described various forms thereof, given by way of example, reference being made to the accompanying drawings, in which.

Figure 1:
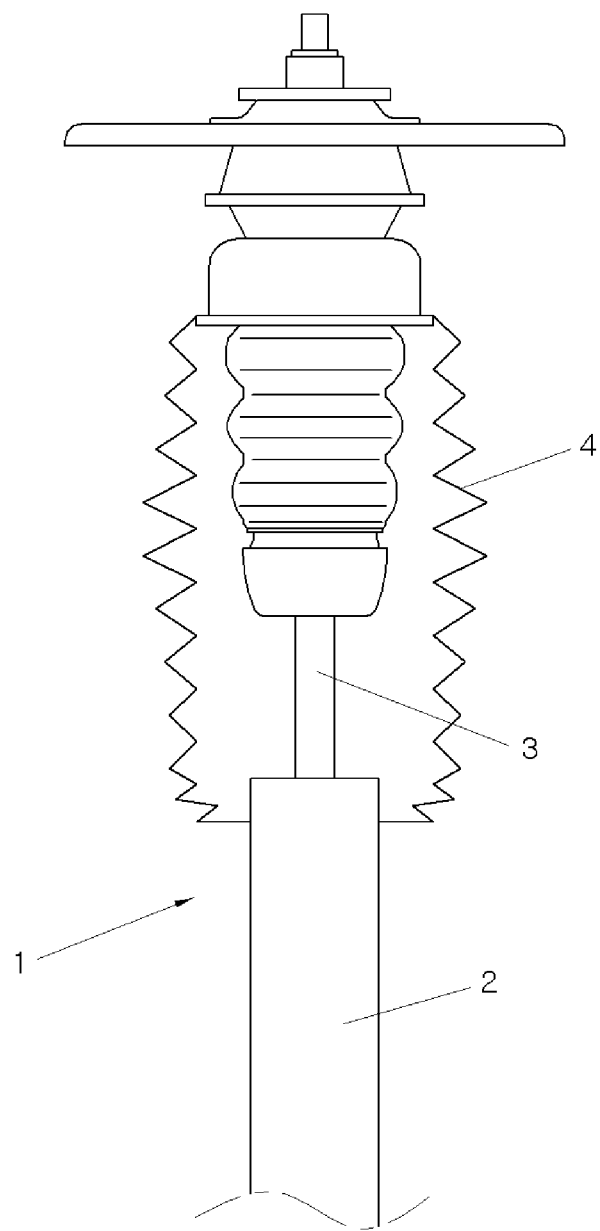
FIG. 1 is an exemplary diagram of a conventional shock absorber.
Figure 2:
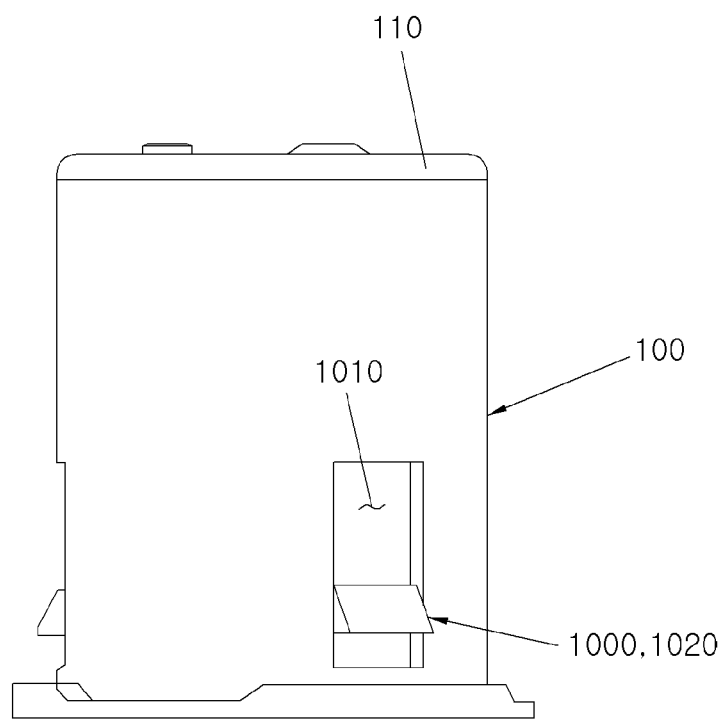
FIG. 2 is a front diagram of a strike cap provided in a strut assembly for a vehicle according to a form of the present disclosure.
Figure 3:
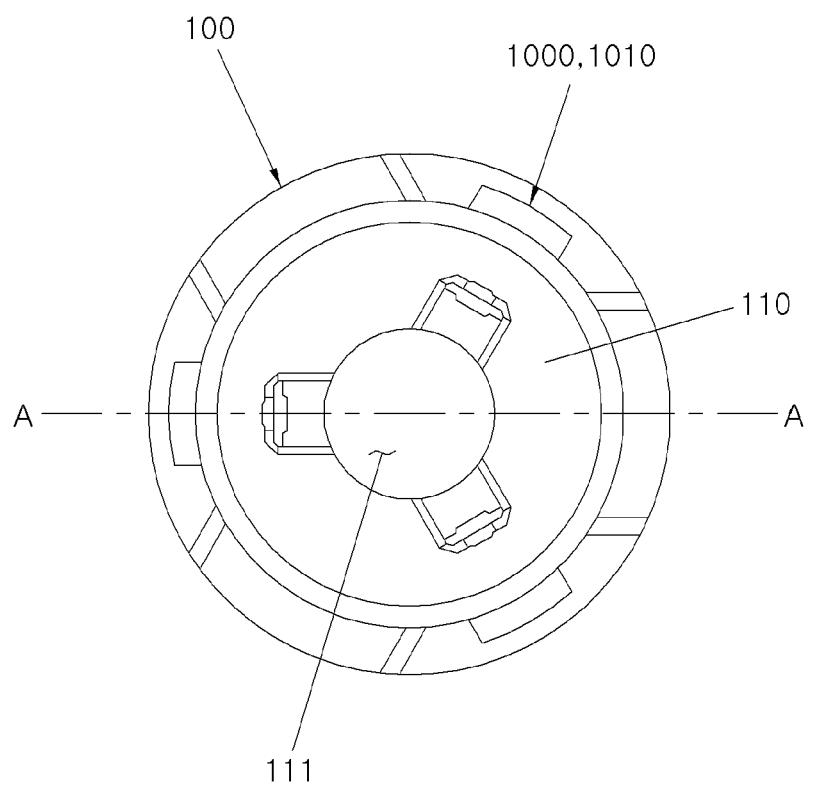
FIG. 3 is a plane diagram of the strike cap of FIG. 2.
Figure 4:
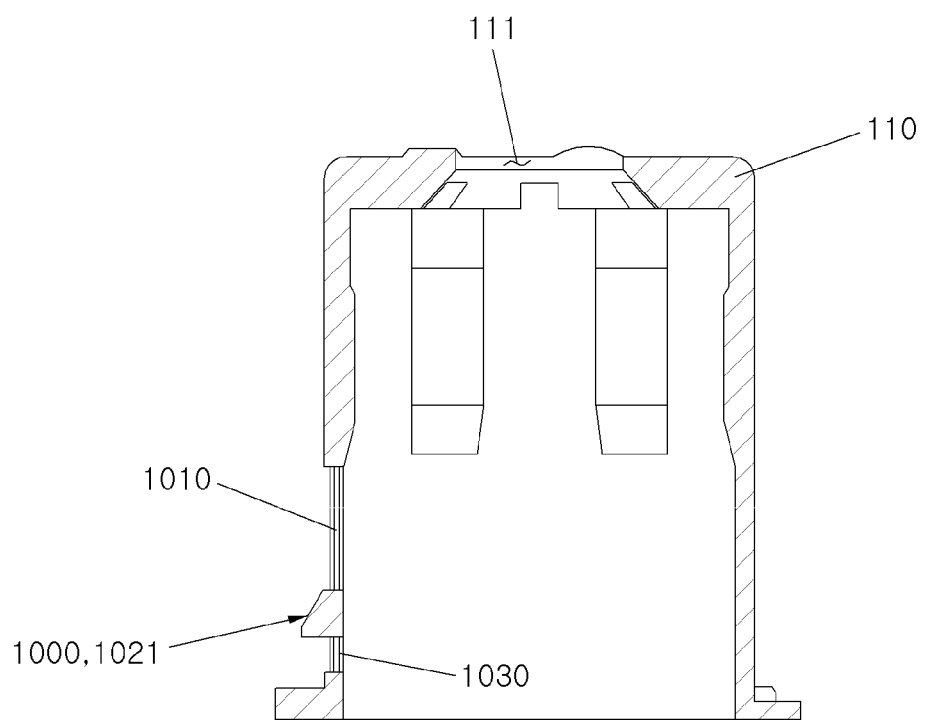
FIG. 4 is a cross-sectional diagram taken along the line A-A of the strike cap of FIG. 3.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIGS. 2 to 7, a strut assembly 10 for a vehicle of a form of the present disclosure includes an insulator part 900 connected to a vehicle body (not shown), a piston rod 300 coupled to the insulator part 900, a damper cylinder 200 coupled with the piston rod 300 and having an operating fluid accommodated therein, a strike cap 100 coupled to the upper portion of the damper cylinder 200, and a sliding part 1000 formed on the side surface of the strike cap 100, and the dust cover 400 is characterized by being coupled to the sliding part 1000.

The strike cap 100 has a through hole 111 through which the piston rod 300 moves formed on the upper surface thereof, and has an outer body 110 opened on the lower surface thereof. The sliding part 1000 is formed on the side surface of the outer body 110.

The outer body 110 is made of reinforced plastic material. The outer body 110 is manufactured in a cylindrical shape with the lower surface opened. A rubber, which is configured to inhibit the fluid stained on the piston rod 300 from flowing to the outside of the outer body 110, is provided inside the outer body 110 adjacent to the through hole 111.

The sliding part 1000 includes one or more side surface holes 1010 formed on the side surface of the strike cap 100, a sliding protrusion 1020 coupled with the dust cover, and mounted on each of the side surface holes 1010, and a guide part 1030 formed in each of the side surface holes 1010 to restrain the sliding protrusion 1020. The guide part 1030 is formed by digging longitudinally along the side surface of the strike cap 100 (that is, the longitudinal direction of the piston rod 300) at the side edges of the side surface hole 1010.

Figure 5:
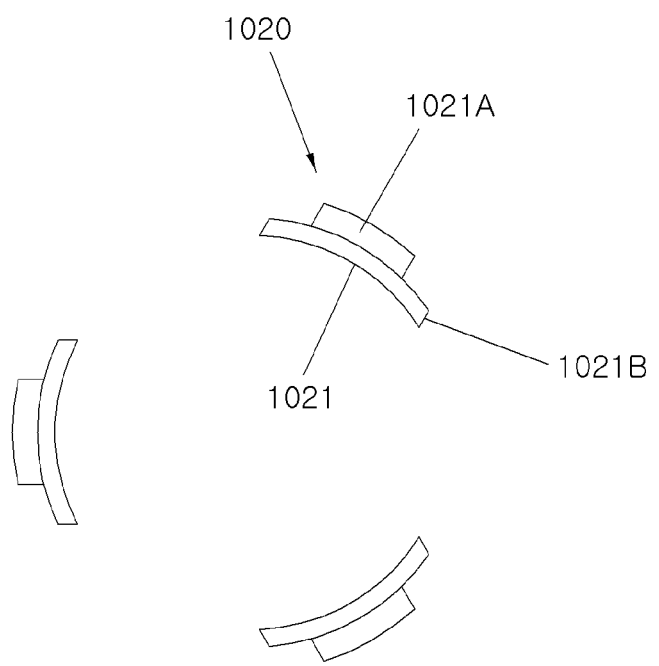
FIG. 5 is a bottom diagram of a sliding protrusion mounted on the strike cap of FIG. 2.
Figure 6:
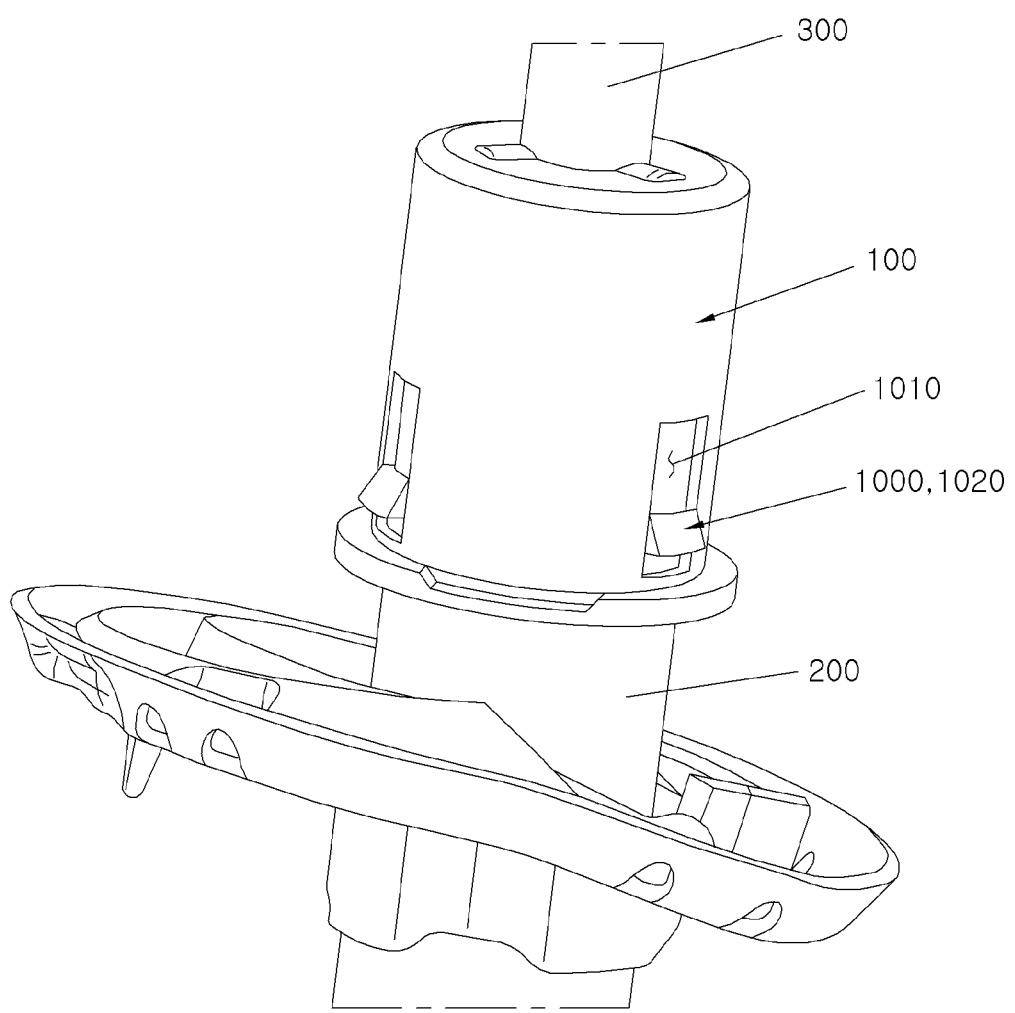
FIG. 6 is an exemplary diagram in which the strike cap of FIG. 2 has been mounted on a shock absorber.

In FIGS. 5 and 6, the sliding protrusion 1020 may include a body 1021 inserted into the side surface hole 1010, a fixing projection 1021A formed to be protruded from the upper surface of the body 1021 and fastened to the dust cover, and an insertion part 1021B formed to be protruded from the side surface of the body 1021 and inserted into the guide part 1030.

Figure 8:
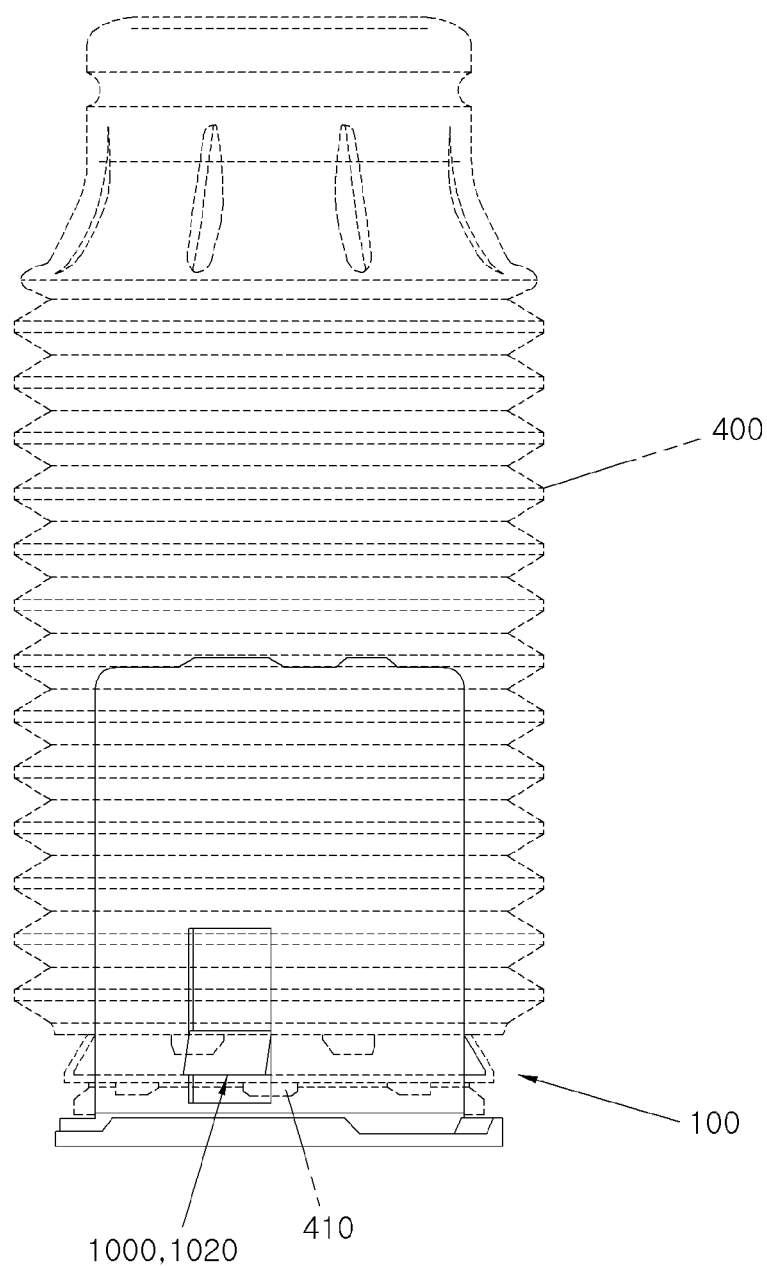
FIGS. 8 and 9 are exemplary diagrams showing the dust cover and the strike cap of FIG. 7.
Figure 9:
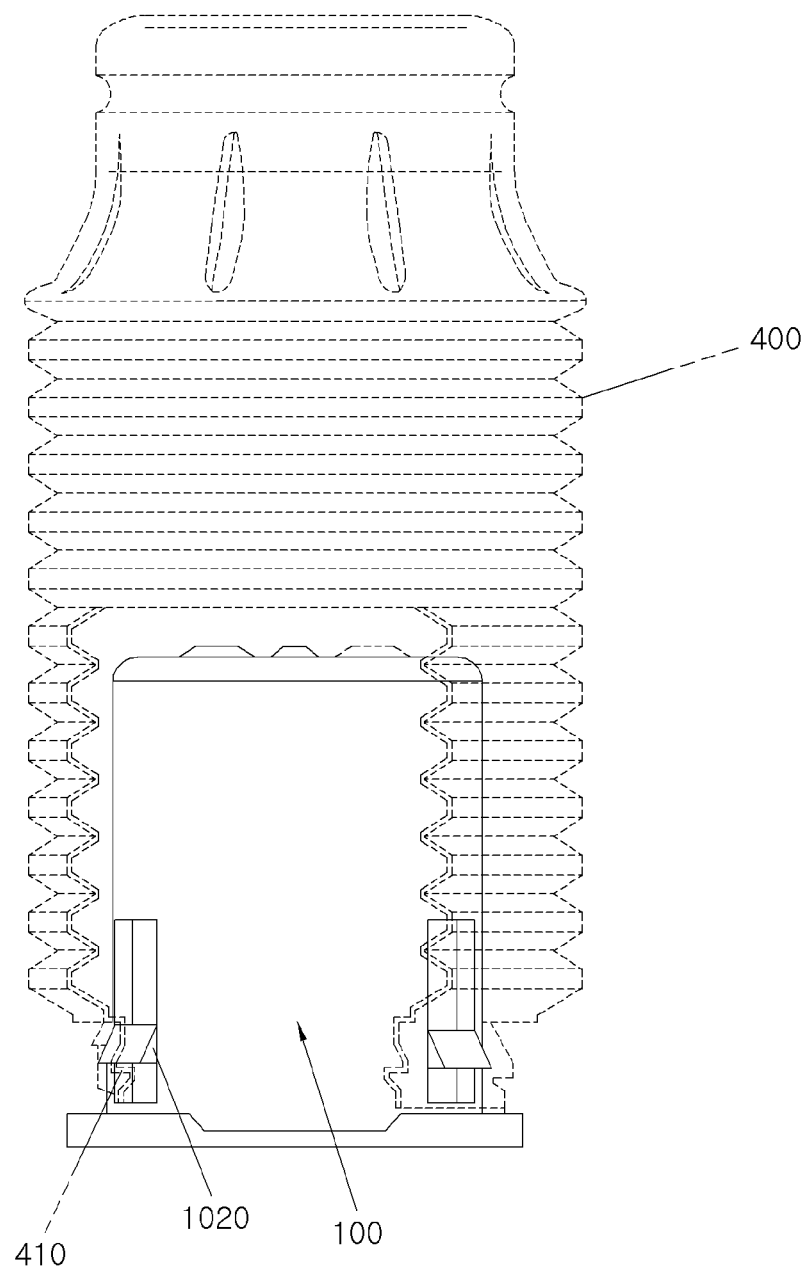

Meanwhile, referring to FIGS. 8 and 9, the wrinkle 410 formed on the dust cover 400 is locked on the fixing projection 1021A to couple the dust cover with the sliding part 1000.

In FIG. 6, the longitudinal width of the body 1021 in a direction in which the piston rod 300 reciprocates is smaller than the longitudinal width in the same direction of the side surface hole 1010, and the lateral width of the body 1021 in a direction perpendicular to the direction in which the piston rod 300 reciprocates is formed equal to the lateral width in the same direction of the side surface hole 1010. Accordingly, the body 1021 may move inside the side surface hole 1010 in the direction in which the piston rod 300 reciprocates, but may not move in a direction perpendicular to the direction in which the piston rod 300 reciprocates. In addition, since the insertion part 1021B maintains a state where the insertion part 1021B has been inserted into the guide part 1030, the body 1021 is inhibited from being separated from the side surface hole 1010. It is possible to change the length of the side surface hole 1010, thereby adjusting the moving distance of the sliding protrusion 1020. If the moving distance of the sliding protrusion 1020 is increased, a change in the shape of the dust cover 400 is reduced.

Figure 10:
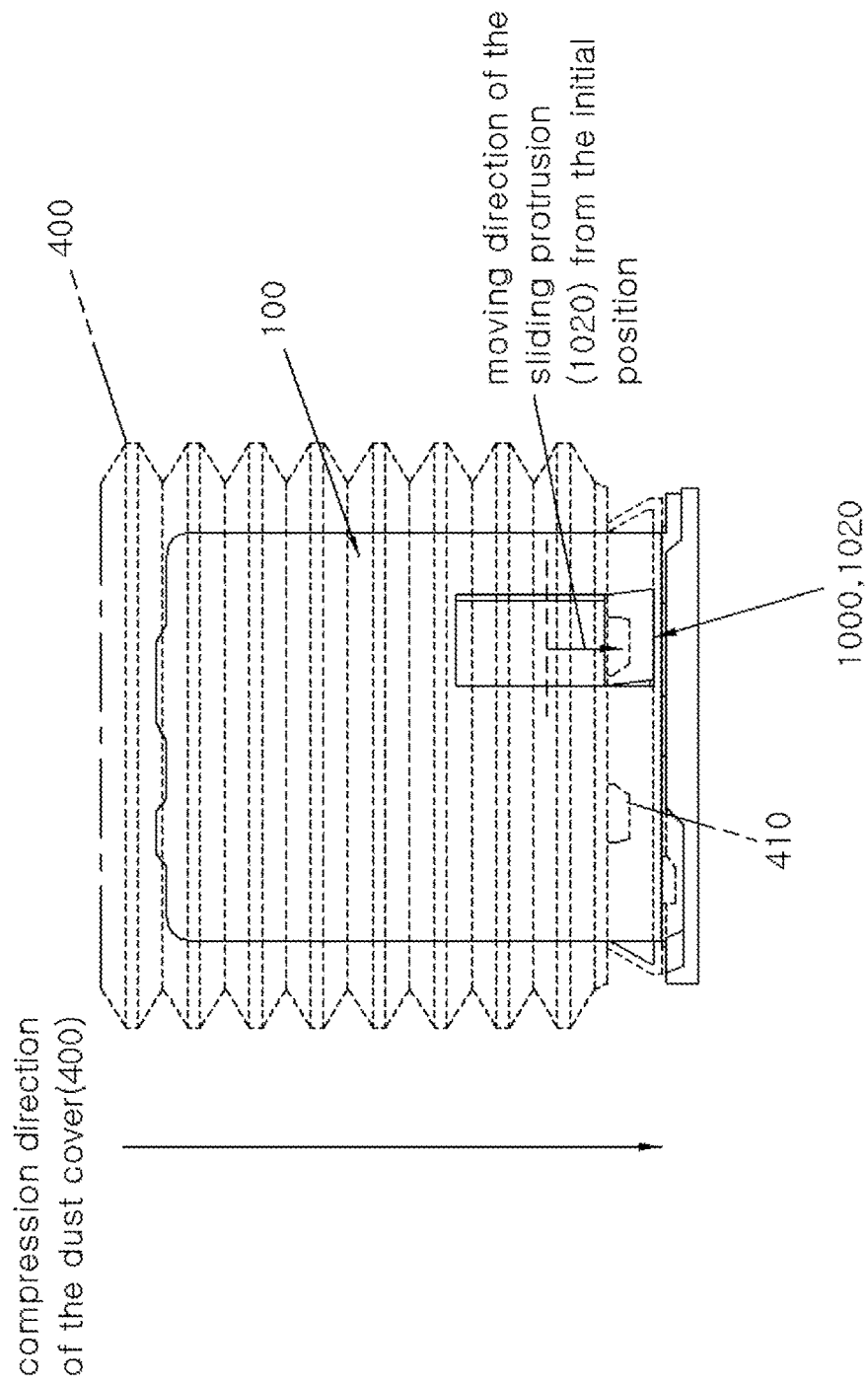
FIG. 10 is a diagram showing a state where a dust cover is compressed, and a sliding protrusion moves when a piston rod is moved into a damper cylinder.
Figure 11:
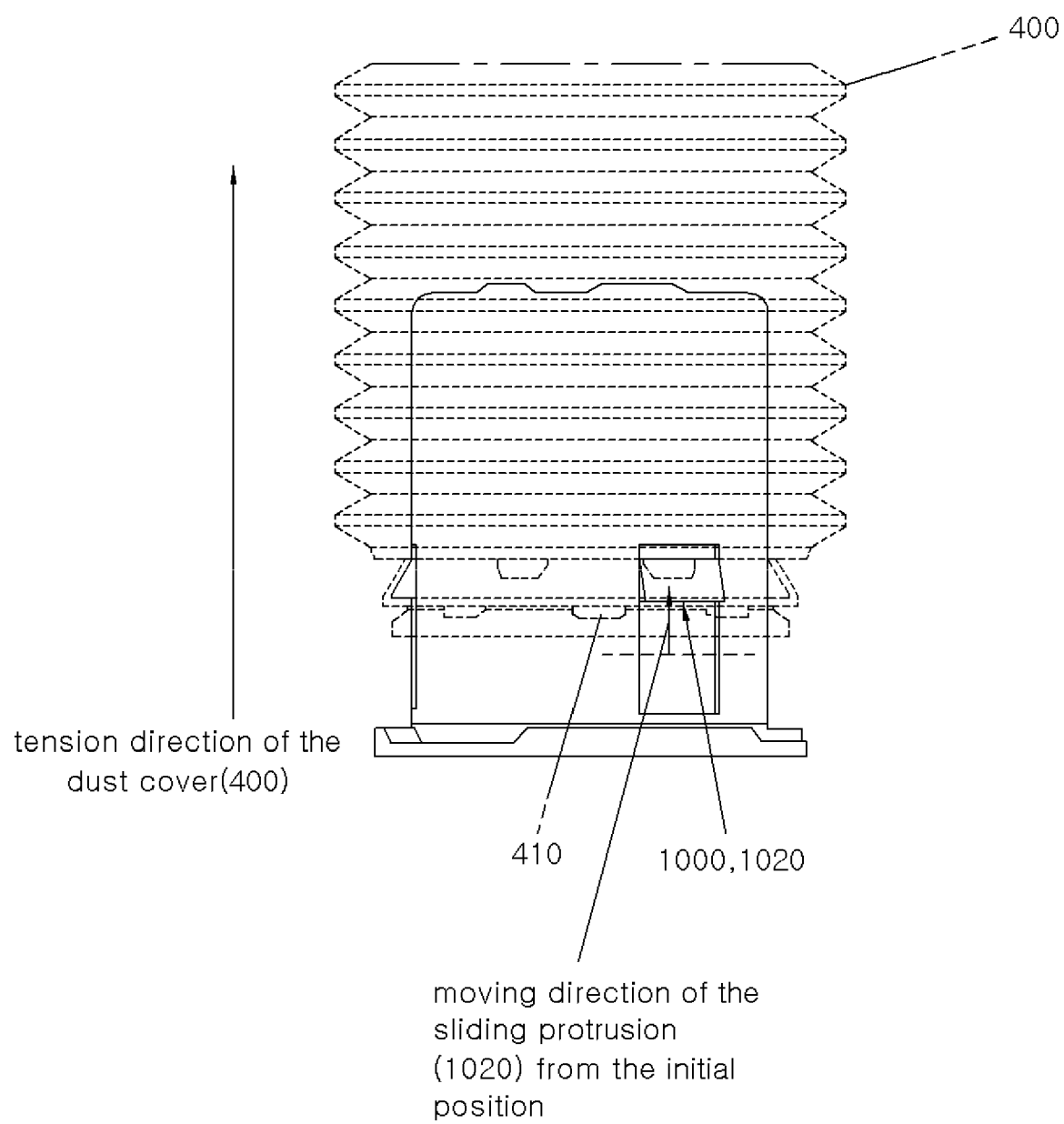
FIG. 11 is a diagram showing a state where a dust cover is tensioned, and a sliding protrusion moves when the piston rod of FIG. 7 is moved away from a damper cylinder.
Figure 12:
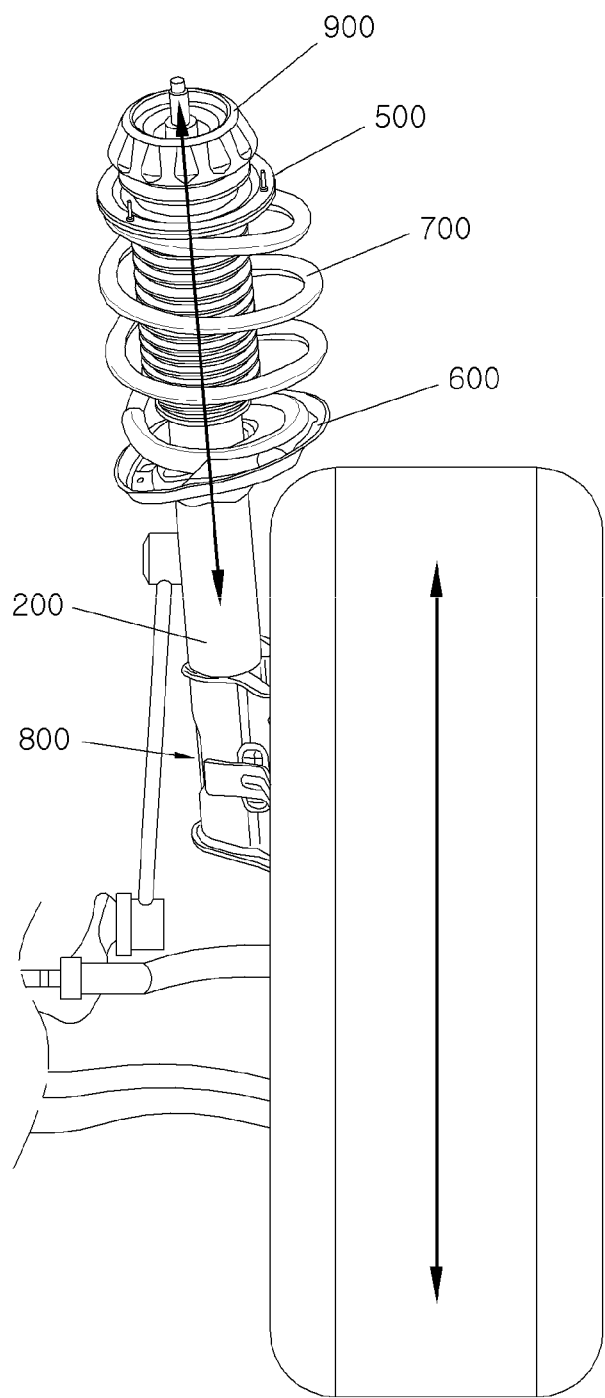
FIG. 12 is a diagram showing a state where the strut assembly for a vehicle of FIG. 7 has been mounted on a vehicle body.

In FIGS. 6, 10, and 11, when the piston rod 300 moves into the damper cylinder 200 and the dust cover 400 is compressed, the sliding protrusion 1020 moves towards the damper cylinder 200 along the longitudinal direction of the piston rod 300 (see FIG. 10). When the piston rod 300 moves outwards from the damper cylinder 200 and the dust cover 400 is tensioned, the sliding protrusion 1020 moves away from the damper cylinder 200 along the longitudinal direction of the piston rod 300 (see FIG. 11).

As a result, as the sliding protrusion 1020 moves vertically in the longitudinal direction of the piston rod 300, the degree of change in the length of the dust cover 400 generated by the compression and tension of the dust cover 400 becomes small. Accordingly, even if the elasticity of the dust cover 400 is reduced, the dust cover 400 is inhibited from being broken due to repeated compression and tension, and the dust cover 400 is inhibited from being separated from the piston rod 300 or the damper cylinder 200.

In particular, if torsion is generated in the piston rod 300 and the torsion is applied to the dust cover 400, a wrinkle 410 formed on the dust cover 400 rotates along the fixing projection 1021A. Accordingly, the dust cover 400 is inhibited from being broken due to the torsion generated in the piston rod 300.

The strike cap 100 of the strut assembly for the vehicle of a form of the present disclosure configured as described above is mounted to the shock absorber as shown in FIG. 6.

As shown in FIGS. 6 to 12, the strut assembly for the vehicle of a form of the present disclosure includes the damper cylinder 200, the piston rod 300, the dust cover 400, the sliding protrusion 1020, a lower spring sheet 600, a spring 700, a bracket assembly 800, and the insulator part 900.

The damper cylinder 200 accommodates a fluid therein. The damper cylinder 200 is manufactured in a cylindrical shape. A flow path through which a fluid flows is formed in the damper cylinder 200. According to the flow path of the fluid in the damper cylinder 200, the flow of the fluid is induced. The fluid is viscosity. The fluid moves along the flow path by the force that the piston rod 300 pressurizes the fluid.

A plurality of through holes through which fluid moves may also be formed at the end portion of the piston rod 300. The piston rod 300 is mounted to be protruded from the damper cylinder 200. The piston rod 300 moves toward the damper cylinder 200 or moves away from the damper cylinder 200 according to the vertical vibration generated in the vehicle body. When the piston rod 300 is moved in or moved out from the damper cylinder 200, the piston rod 300 is resistant to the fluid accommodated in the damper cylinder 200. According to the degree to which the piston rod 300 is resistant to the fluid, the spring 700 is inhibited from being rapidly deformed by an external force.

The dust cover 400 is formed as a bellow shape. The dust cover 400 is made of a polymer material. When the piston rod 300 reciprocates in the damper cylinder 200, the dust cover 400 covers a part of the piston rod 300 existing outside the damper cylinder 200 so that the fluid stained on the surface of the piston rod 300 is not exposed to the air floating matter. The dust cover 400 is mounted between an end portion of the damper cylinder 200 and an end portion of the piston rod 300, which is away from the end portion of the damper cylinder 200.

In addition, the strike cap 100 may be separately formed and attached to the damper cylinder 200, or may be integrally or unitarily formed with the damper cylinder 200 (e.g., by being incorporated into an outer housing portion of the damper cylinder 200). According to a form of the present disclosure, the sliding part 1000 is coupled with the end portion of the damper cylinder 200 so that the dust cover 400 is not separated from the end portion of the damper cylinder 200. A stopper 1100 for limiting the length of the piston rod 300 inserted (moved) into the damper cylinder 200 is provided on the end portion of the piston rod 300. The strike cap 100 contacting the stopper 1100 is provided on the end portion of the damper cylinder 200. The sliding part 1000 is disposed in the strike cap 100.

When the piston rod 300 moves into the damper cylinder 200 and the dust cover 400 is compressed, the sliding protrusion 1020 moves in a downward direction, which is the same moving direction of the piston rod 300. When the piston rod 300 moves outwards from the damper cylinder 200 and the dust cover 400 is tensioned, the sliding protrusion 1020 moves in an upward direction, which is the same moving direction of the piston rod 300.

As a result, as the sliding protrusion 1020 moves vertically in the longitudinal direction of the piston rod 300, the degree of change in the length of the dust cover 400 generated by the compression and tension of the dust cover 400 is reduced. Accordingly, the aging of the dust cover 400 is delayed. Even if the dust cover 400 is aged and the elasticity of the dust cover 400 becomes decreased, the dust cover 400 is inhibited from being broken due to the repeated compression and tension of the dust cover 400, and the dust cover 400 is inhibited from being separated from the piston rod 300 or the damper cylinder 200. In particular, when torsion is generated in the piston rod 300 and the torsion is applied to the dust cover 400, the wrinkle 410 formed on the dust cover 400 rotates along the fixing projection 1021A. Accordingly, the dust cover 400 is inhibited from being broken due to the torsion.

Figure 7:
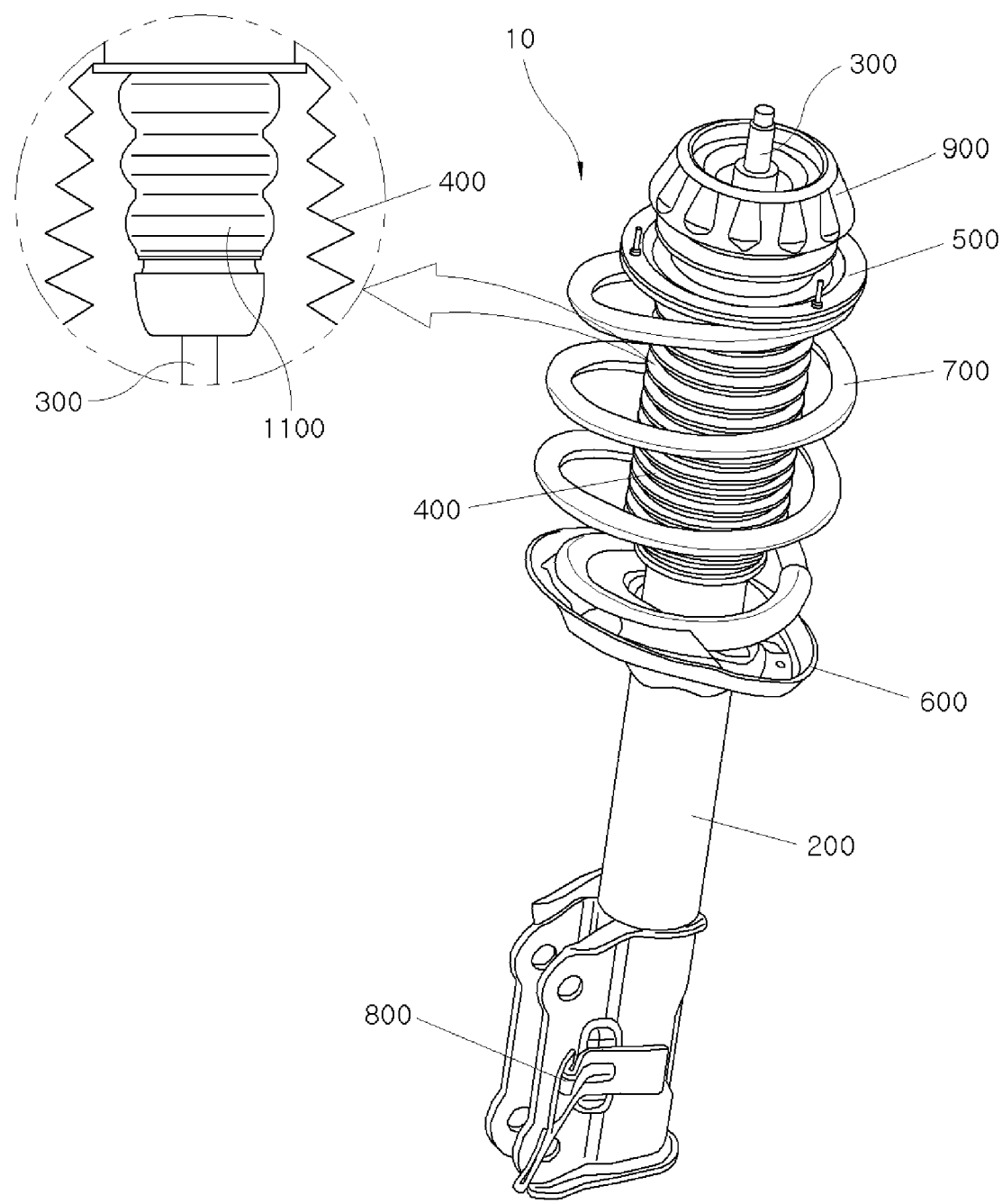
FIG. 7 is an exemplary diagram of a strut assembly for a vehicle according to a form of the present disclosure.

As shown in FIG. 7, the upper spring sheet 500 is mounted on the end portion of the piston rod 300, which is away from the end of the damper cylinder 200, and the lower spring sheet 600 is mounted on the end portion of the damper cylinder 200. The upper spring sheet 500 and the lower spring sheet 600 are mounted with a rubber pad contacting the spring 700. The rubber pad inhibits the upper spring sheet 500 and the lower spring sheet 600 from being deformed by the pressing force by the spring 700, and the spring 700 is inhibited from being released from its position. A spring hose covering the end of the spring 700 is provided on the lower spring sheet 600 so as to inhibit damage to the spring 700.

The spring 700 is formed in a compression coil shape. The spring 700 is made of a high strength iron material. The spring 700 is mounted between the upper spring sheet 500 and the lower spring sheet 600 so that the dust cover 400 is embedded therein.

The bracket assembly 800 is mounted on the damper cylinder 200 so as to fasten the damper cylinder 200 to the vehicle body. The insulator part 900 is mounted on the piston rod 300 to fasten the piston rod 300 to the vehicle body. The insulator part 900 is provided with a bearing. The piston rod 300 is inhibited from being destroyed by the torsion generated in the vehicle body by the bearing.

According to the strut assembly for the vehicle of a form of the present disclosure configured as described above, even if the dust cover 400 is aged and the protrusion length of the piston rod 300 from the damper cylinder 200 is increased in a state where elasticity of the dust cover 400 has been reduced, the connection portion between the dust cover 400 and the damper cylinder 200 is inhibited from being broken and the dust cover 400 and the damper cylinder 200 are inhibited from being separated from each other. This is because the sliding protrusion 1020 moves according to the movement of the dust cover 400, thereby supplementing the longitudinal deformation range of the dust cover 400.

In addition, since the height of the sliding protrusion 1020 is variable, the height of the connection portion between the dust cover 400 and the damper cylinder 200 may be changed with respect to the bottom of the strike cap 100. Accordingly, even if the dust cover 400 is manufactured in the same size, the dust cover 400 may be properly mounted in each vehicle. Also, however, the dust cover 400 may be manufactured in different sizes for each vehicle.

In addition, the wrinkle 410 formed on the dust cover 400 is a structure that is locked on the fixing projection 1021A, and the dust cover 400 and the sliding protrusion 1020 are connected. Accordingly, even if torsion is applied to the dust cover 400, the wrinkle 410 formed on the dust cover 400 may be rotated along the fixing projection 1021A, and accordingly, the dust cover 400 may be inhibited from being broken due to the torsion.

In particular, the gap communicating between the inside of the dust cover 400 and the air is minutely formed at both sides of the fixing projection 1021A of the sliding protrusion 1020. The gap inhibits the internal pressure of the dust cover 400 from being rapidly changed.

According to the related art, when the dust cover 400 is tensioned according to the operation of the shock absorber, a negative pressure is formed while the internal space of the dust cover 400 is expanded. Since there was no gap between the dust cover 400 and the strike cap 100, the dust cover 400 is destroyed by the negative pressure generated therein at the time of expansion of the dust cover 400, and foreign matter could be sucked into the dust cover 400 through the broken portion. However, the minute gap is secured in the side surface of the fixing projection 1021A, such that even if the dust cover 400 is tensioned, the negative pressure is not generated in the dust cover 400, and ultimately, the suction of the foreign matter into the dust cover 400 does not occur.

In addition, according to the related art, when the dust cover 400 is compressed according to the operation of the shock absorber, the static pressure is formed while the internal space of the dust cover 400 is reduced. Since there was no gap between the dust cover 400 and the strike cap 100, the dust cover 400 could be destroyed by the static pressure generated therein at compression of the dust cover 400, and the oil existing inside the dust cover 400 could be leaked through the broken portion. However, the minute gap is secured in the side surface of the fixing projection 1021A, such that even if the dust cover 400 is compressed, the static pressure is not generated inside the dust cover 400, and ultimately, the oil is not leaked to the outside of the dust cover 400.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A strut assembly for a vehicle, the strut assembly comprising:
    an insulator part connected to a vehicle body;
    a piston rod coupled to the insulator part;
    a damper cylinder coupled with the piston rod, and having an operating fluid accommodated therein;
    a strike cap coupled to an upper portion of the damper cylinder; and
    a sliding part formed on a side surface of the strike cap,
    wherein a dust cover is coupled to the sliding part,
    wherein the sliding part comprises:
        one or more side surface holes formed on the side surface of the strike cap,
        a sliding protrusion coupled with the dust cover and mounted in each of the side surface holes, and
        a guide part formed in each of the side surface holes so as to restrain the sliding protrusion, and
    wherein the guide part is formed by digging longitudinally along the side surface of the strike cap at side edges of the side surface hole.

2. The strut assembly of claim 1,
wherein the sliding protrusion comprises
    a body inserted into the side surface hole,
    a fixing projection formed to protrude from an upper surface of the body and fastened to the dust cover, and
    an insertion part formed to protrude from a side surface of the body and inserted into the guide part.

3. The strut assembly of claim 2,
wherein the body is configured so that a longitudinal width of the body in a direction in which the piston rod reciprocates is smaller than a longitudinal width of the side surface hole, and
a lateral width of the body in a direction perpendicular to a direction in which the piston rod reciprocates is equal to a lateral width of the side surface hole.

4. A strut assembly for a vehicle, the strut assembly comprising a sliding part coupled with a dust cover mounted between a damper cylinder and a piston rod,
wherein the sliding part comprises
    one or more side surface holes formed on a surface of the damper cylinder;
    a sliding protrusion coupled with the dust cover and mounted on each of the side surface holes so as to move according to the movement of the dust cover; and
    a guide part formed on each of the side surface holes so as to restrain the sliding protrusion, and
wherein the guide part is formed by digging longitudinally along the side surface of the damper cylinder at side edges of the side surface hole.

5. The strut assembly of claim 4,
wherein when the piston rod moves outwards from the damper cylinder, the sliding protrusion moves in an upward direction, which is the same moving direction of the piston rod, and
when the piston rod moves into the damper cylinder, the sliding protrusion moves in a downward direction, which is the same moving direction of the piston rod.

6. The strut assembly of claim 4,
wherein a stopper configured to restrain a length of the piston rod moved into the damper cylinder is provided on an end portion of the piston rod,
wherein the damper cylinder includes a strike cap contacting the stopper, and
wherein the one or more side surface holes are formed in the strike cap.

* * * * *